Patented Aug. 22, 1944

2,356,594

UNITED STATES PATENT OFFICE 2,356,594

PROCESS FOR THE PREPARATION OF VITAMIN B1 AND OF SIMILARLY BUILT COMPOUNDS

Rezső König, Árpád Gerecs, and Zoltán Földi, Budapest, Hungary; vested in the Alien Property Custodian No Drawing. Application April 24, 1941, Serial No. 390,124. In Hungary May 25, 1940

7 Claims. (Cl. 260—251)

The present invention relates to a new process for preparing vitamin B1 and compounds of similar structure. This process consists in subjecting a member of the group consisting of γ-aceto-γ-halogen-propyl alcohol [its cyclic form, ethers of the cyclic form, semi-cyclic form of γ-aceto-γ-halogen-propyl alcohol] to the action of reagents generally used for replacing an alcoholic hydroxyl group with a halogen atom and in subjecting the 2-methyl-2,3-dihalogen-tetrahydrofurane, thus obtained, to the action of 2-alkyl-4-amino-5-[thioform-amido-alkyl]-pyrimidines.

A preferred form of the invention consists in subjecting a member of the group consisting of γ-aceto-γ-chloro-propyl alcohol [its cyclic form, ethers of the cyclic form, semi-cyclic form of the γ-aceto-γ-chloro-propyl alcohol] to the action of reagents generally used for replacing a hydroxyl group with a chlorine atom and in subjecting the 2-methyl-2,3-dichloro-tetrahydrofurane, thus obtained, to the action of 2-methyl-4-amino-5-[thioformamido-methyl]-pyrimidine. One may further proceed in subjecting reaction mixtures containing one or more members of the group consisting of γ-aceto-γ-chloro-propyl alcohol, its cyclic form, its semi-cyclic form, an ether of the cyclic form of the γ-aceto-γ-chloro-propyl alcohol, to the action of hydrochloric acid and in subjecting the 2-methyl-2,3-dichloro-tetrahydrofurane, thus obtained, to the action of 2-methyl-4-amino-5-[thioformamido-alkyl]-pyrimidine.

The action of the 2-methyl-2,3-dihalogen-tetrahydrofurane on 2-alkyl-4-amino-5-[thioformamido-alkyl]-pyrimidine is preferably carried out in formic acid as reaction medium. One may use preferably an acid binding agent, such as tertiary bases [pyridine], or alkali salts of organic acids [e. g. potassium formate or sodium benzoate] which will bind the halogen acid, such as hydrochloric acid, formed during the reaction.

Another object of the present invention is to provide for methods to prepare 2-methyl-2,3-dichloro-tetrahydrofurane, which have been unknown till now. For this purpose one may subject γ-aceto-γ-chloro-propyl alcohol to the action of gaseous hydrogen chloride when the following compound is formed:

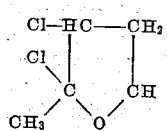

The γ-aceto-γ-chloro-propyl alcohol exists mainly—as described in the literature—in the cyclic form, this form being in a relation of desmotropy with the open chain form:

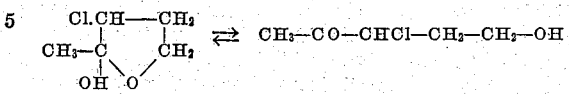

Thus, the so-called aceto-chlor-propyl alcohol is a mixture of the two desmotropic forms. The γ-aceto-γ-chloro-propyl alcohol prepared as described in several previous papers [such as Buchman Journ. of Americ. Chem. Soc. 58, 1083-84, Todd and Bergel, Journ. of the Chem. Soc., London 1937, 364-67 and Stevens and Stein loc. cit.] contains more or less considerable amounts of a semi-cyclic form that is of an ether which is built up from the cyclic form and from the open chain form, which ether has the following formula:

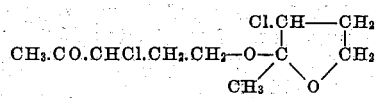

as shown by Stevens and Stein in the Journ. of the Americ. Chem. Soc., vol. 62, page 1045. All these parent components of the γ-aceto-γ-chloro-propyl alcohol are capable of the same reaction with reagents generally used for replacing a hydroxyl group with a halogen group. Therefore, all γ-aceto-γ-chloro-propyl alcohols obtained by the different methods to be found in the literature can be used as starting materials with the same good result and it is not necessary to separate the different parent constituents from each other. In the following, when γ-aceto-γ-chloro-propyl alcohol is mentioned without further designation, the chemically pure γ-aceto-γ-chloro-propyl alcohol itself, or the γ-aceto-γ-chloro-propyl alcohol of a quality as described by Todds and Bergel [loc. cit.], or as described by Buchman [loc. cit.], or as described by Stevens and Stein [loc. cit.], or mixtures thereof are to be meant. The experiments described have been effected with the same good results with the different types enumerated above.

The 2-methyl-2,3-dichloro-tetrahydrofurane can be prepared also by decarboxylating the aceto-chloro-butyrol actone with concentrated hydrochloric acid, saturating the reaction mixture with hydrogen chloride gas and removing the formed tetrahydrofurane-dichloro derivative. This dichloride can also be obtained by other methods, e. g. by subjecting aceto-chloro-propyl alcohol to the action of thionylchloride. The details of the preparation of the abovementioned product can be found in the following.

One proceeds by starting from aceto-chloro-propyl alcohol as follows:

50 grams of aceto-chloro-propyl alcohol are saturated while cooling in a refrigerated mixture with dry hydrogen chloride gas. One observes about 18 grams of increase of weight and an aqueous layer separates. Dehydrated sodium sulphate is added to the reaction mixture; then the obtained oil is decanted and distilled in vacuo under a pressure of 2 mm. Hg. At about 45° C. 47–50 g. of 2-methyl-2,3-dichloro-tetrahydrofurane are obtained. The product distills by atmospheric pressure in part under decomposition, or:

5 grams of the alcohol are poured over with 5 grams of thionyl-chloride. One observes a rise in temperature and development of gas. The mixture is kept then for 1 hour at 50° and the excess of thionylchloride is distilled off in the vacuo of a blast-pump. The residual oil is distilled in vacuo at a pressure of 0.5 mm. Hg. At the temperature of about 39–43° 2.8 g. of 2-methyl-2,3-dichloro-tetra-hydrofurane distills, which forms a colourless mobile liquid slightly fuming in the air. It contains about 43.5% of chlorine.

It can be prepared from aceto-chloro-butyrolactone in the following manner:

50 grams of aceto-chloro-butyrolactone and 25 ccm. of concentrated hydrochloric acid are stirred for 3 hours at 35°. During this the formation of carbonic acid stops. By heating the mixture to 50° no remarkable formation of carbonic acid can be observed. Afterwards the mixture is cooled with a refrigerating mixture and saturated during three hours with hydrogen chloride gas. The obtained oil is taken up in chloroform dried with dehydrated sodium sulfate, then the chloroform is removed and the residual oil is fractionated in vacuo at a pressure of 1 mm. Hg. One obtains 26.28 g. of 2-methyl-2,3-dichloro-tetrahydrofurane containing about 45% of chlorine.

The product can be obtained starting from aceto-chloro-butyrolactone also in the following manner:

It is mixed with about 1 mol. of water and is saturated at room temperature under stirring with hydrogen chloride gas. It is stirred until no formation of carbonic acid is observed. In the meantime the temperature can be raised to 35–40°. Afterwards it is cooled in a refrigerating mixture, saturated with hydrogen chloride gas and shaken out with petroleum ether. After the removal of the petroleum ether the residual product is fractionated. The fraction distilling at about 50° in vacuo at a pressure of 8 mm. Hg. contains the 2-methyl-2,3-dichloro-tetrahydrofurane.

One may proceed starting from aceto-chloro-butyrolactone also as follows:

50 grams of aceto-chloro-butyrolactone and 6 ccm. of hydrochloric acid of 5 volumetric percentage are stirred for several hours on the water bath until the end of the formation of carbonic acid. One observes the theoretical loss of weight; at the same time the two original layers also disappear. Afterwards the reaction mixture is cooled in a refrigerating mixture and saturated with hydrogen chloride gas. The formed oil is taken up in chloroform, or in petrolether, then the solution is dried eventually with dehydrated sodium sulfate and after removing the solvent the residual oil is fractionated at a pressure of 1 mm. Hg. One obtains about 35 grams 2-methyl-2,3-dichloro-tetrahydrofurane containing about 44–45% of chlorine.

Details for the preparation of vitamin $B_1$ or of similarly built compounds are to be found in the following with the remark that instead of the latter mentioned pyrimidine compound also homologous compounds can be used.

To 10 ccm. of formic acid of 91% first 7.7 grams of 2-methyl-2,3-dichloro-tetrahydrofurane, then under cooling in icewater 3.9 grams of pyridine are added. To this mixture 5 grams of 2-methyl-4-amino-5-[thioformamido-methyl]- pyrimidine are added. The temperature rises slightly and a crystalline compound precipitates, then the reaction mixture is kept for 40 hours in an incubator of 50°. One obtains a light brown solution to which 45 ccm. of absolute alcohol and 5 ccm. of absolute alcohol containing 30% of hydrogen chloride gas are added. After boiling the mixture, the vitamin $B_1$ crystallizes in the form of white crystalline plates. The mixture is kept for from one to two hours in ice-water, filtered by suction and washed with 20 ccm. of absolute alcohol. The product dried in vacuo weighs 4.5–5.3 grams and melts at about 240°.

In the foregoing example the pyridine was used as acid binding agent. In the following example the use of potassium formate is shown:

Under cooling and stirring to 2 ccm. of formic acid of about 100% 1.5 grams of 2-methyl-2,3-dichloro-tetrahydrofurane, 0.85 gram of dry potassium formate in form of a fine powder and 1 gram of 2-methyl-4-amino-5-[thioformamido-methyl]-pyrimidine are added, then the reaction mixture thus obtained is kept for 65 hours in an incubator of 50°. Afterwards 9 ccm. of absolute alcohol and 1 ccm. of absolute alcohol containing 30% of hydrogen chloride gas are added to the reaction mixture which is then boiled. The crystals precipitating at cooling are filtered by suction after about an hour standing. The crystals are dissolved in water and 20 ccm. of a hot aqueous solution of 1.7 grams ammonium picrate are added. The obtained picrate is filtered, after a short standing, by suction, washed with water and dried in vacuo. One obtains about 2.3 grams of picrate having a melting point of 203–204°. Then, the picrate is boiled in 20 ccm. of absolute alcohol, then 5 ccm. of absolute alcohol containing 30% of hydrogen chloride gas are added while the picrate goes, temporary, into solution. Then the hydrochloride of the vitamin $B_1$ crystallizes. After standing for an hour the vitamin $B_1$ crystals are filtered by suction, washed with 10 ccm. of absolute alcohol and dried in vacuo. One obtains about 0.9 gram vitamin $B_1$ melting at 248°.

What we claim is:

1. The preparation of vitamins of the type $B_1$ from a 2,methyl-2.3,dihalogen-tetrahydrofurane which comprises reacting on said compound in an acidic reaction medium with a 2,alkyl-4,amino-5 (thioformamido-alkyl)-pyrimidine.

2. The preparation of vitamins of the type $B_1$ from 2, methyl-2.3, dichloro-tetrahydrofurane, which comprises reacting on said compound in an acidic reaction medium with a 2,methyl-4,amino-5(thioformamido-alkyl pyrimidine.

3. The preparation of vitamins of the type $B_1$ from 2,methyl-2.3,dichloro-tetrahydrofurane which comprises reacting on said compound in an acidic medium with 2,methyl-4,amino-5(thioformamido-methyl) pyrimidine.

4. The process as set forth in claim 1, in which the reaction medium is formic acid.

5. The process as set forth in claim 1, in which the reaction medium is formic acid and an acid binding agent is present.

6. The process as set forth in claim 1, in which there is present an acid binding agent selected from the group consisting of pyridine and potassium formate.

7. In the preparation of vitamin $B_1$ the step, which consists in subjecting 2-methyl-2,3-dichloro-tetrahydrofurane to the action of 2-methyl - 4 - amino - 5-[thioformamido - methyl]-pyrimidine.

REZSŐ KÖNIG.
ÁRPÁD GERECS.
ZOLTÁN FÖLDI.